Nov. 29, 1966 P. E. MERCIER 3,288,486

VEHICLE SUSPENSION SYSTEMS

Filed May 6, 1964 14 Sheets-Sheet 1

Inventor
Pierre Ernest
Mercier
By Richard Gord
Atty

Inventor
Pierre Ernest Mercier
By Richard [illegible]
Agt

Inventor
Pierre
Ernest Mercier
By Richard [illegible]
Agt

Nov. 29, 1966　　P. E. MERCIER　　3,288,486

VEHICLE SUSPENSION SYSTEMS

Filed May 6, 1964　　14 Sheets-Sheet 4

Inventor
Pierre Ernest Mercier
By
Richard Lord
Agt

Nov. 29, 1966 P. E. MERCIER 3,288,486

VEHICLE SUSPENSION SYSTEMS

Filed May 6, 1964 14 Sheets-Sheet 5

Inventor
Pierre Ernest Mercier
By Richard Ernst
Ag't

Nov. 29, 1966 P. E. MERCIER 3,288,486

VEHICLE SUSPENSION SYSTEMS

Filed May 6, 1964 14 Sheets-Sheet 6

Inventor
Pierre Ernest Mercier
By [signature]
Agt

Nov. 29, 1966 P. E. MERCIER 3,288,486

VEHICLE SUSPENSION SYSTEMS

Filed May 6, 1964 14 Sheets-Sheet 7

Inventor
Pierre Ernest Mercier
By Richard [illegible]
Ag't

VEHICLE SUSPENSION SYSTEMS

Inventor
Pierre Ernest Mercier
By Richard Lund
Ag't

Inventor
Pierre Ernest Mercier
By Richard [illegible]
Att'y

Nov. 29, 1966 P. E. MERCIER 3,288,486

VEHICLE SUSPENSION SYSTEMS

Filed May 6, 1964 14 Sheets-Sheet 10

Inventor
Pierre
Ernest Mercier
By Richard Lund
Att'y

Nov. 29, 1966
P. E. MERCIER
3,288,486
VEHICLE SUSPENSION SYSTEMS
Filed May 6, 1964
14 Sheets-Sheet 11
Fig. 19
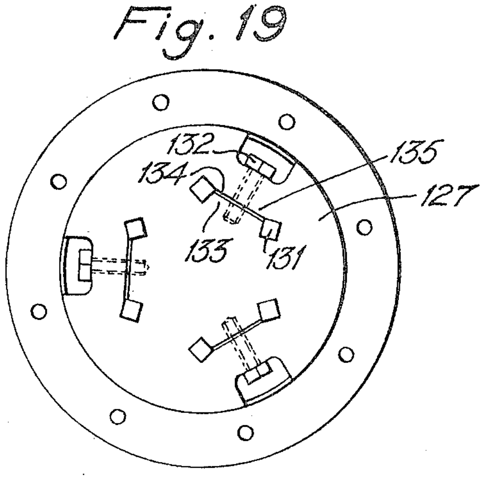
Fig. 21
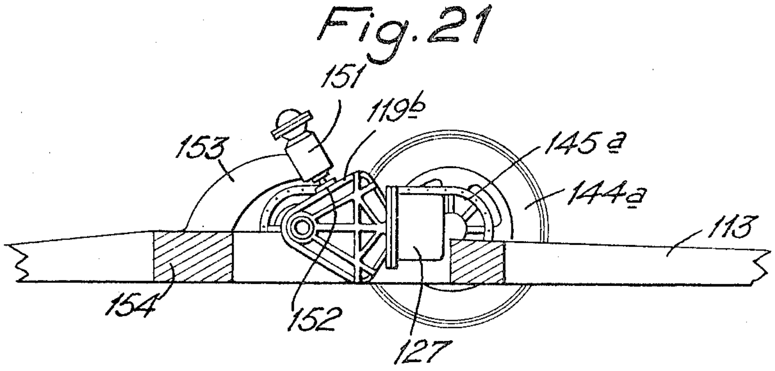
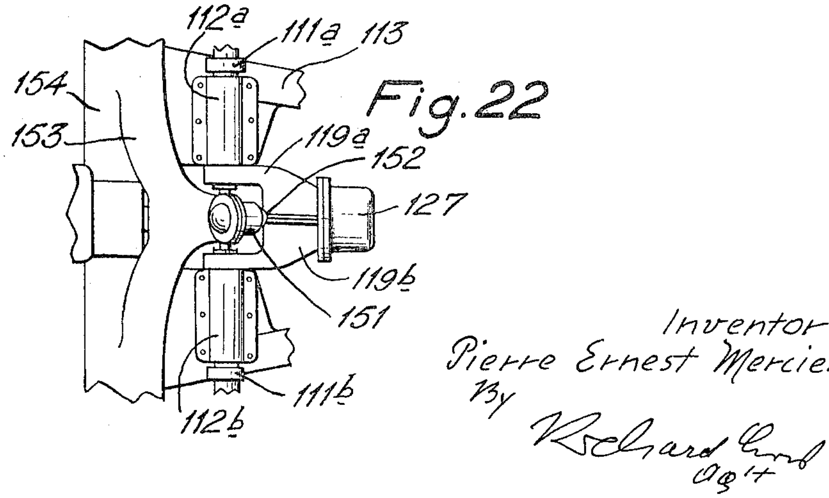
Fig. 22
Inventor
Pierre Ernest Mercier
By Richard [illegible]
Ag't Inventor
Pierre Ernest Mercier
By
Richard [signature]
Ag't Inventor
Pierre Ernest Mercier
By [signature] Ag't Nov. 29, 1966   P. E. MERCIER   3,288,486
VEHICLE SUSPENSION SYSTEMS
Filed May 6, 1964   14 Sheets-Sheet 13

Inventor
By Richard Linn
Ag't

Inventor
Pierre Ernest
Mercier
By
Ag't

United States Patent Office 3,288,486
Patented Nov. 29, 1966

3,288,486

VEHICLE SUSPENSION SYSTEMS

Pierre Ernest Mercier, Piscop, France, assignor to Société Francaise d'Entretien et de Réparation de Matériel Aéronautique (S.F.E.R.M.A.), Suresnes, France Filed May 6, 1964, Ser. No. 365,423
Claims priority, application France, May 11, 1963, 934,515, Patent 1,372,467; Sept. 6, 1963, 946,795, Patent 84,294
35 Claims. (Cl. 280—112)

This invention relates to a suspension system which is applicable to sets of paired vehicle wheels disposed symmetrically relative to the longitudinal axis or a transverse axis of the vehicle chassis.

The present invention has for object an integrated suspension system for a pair of vehicle wheels, characterized in that it comprises two preferably aligned pivotal main shafts substantially parallel with the chasis plane and rigidly connected to the respective wheel hubs, a differential reversal device which is carried by a support pivotally connected to the chassis coaxially with the main shafts and which is so devised that, in the absence of any movement of said support relative to the chasis, concerted movement of the main shafts in opposite directions be made possible by the rotation relative to said support of at least one movable component inserted between the differential reversal device members directly connected to the facing ends of the main shafts, and two sets of preferably damped elastic members of which one controls the angular motion of said movable component relative to said support and the other the angular motion of said support relative to the chassis about its axis of pivotal connection thereto, whereby the first set of elastic members define the degree of flexibility of said main shafts for differential rotation thereof and the second set of elastic members the degree of flexibility of said main shafts for rotation thereof in unison in the same direction.

The connection between the pivotal main shafts and the wheel-bearing members of said pair of wheels is so devised that there corresponds to each position of one of these wheels an angular position of the shaft connected thereto, neglecting such variations due to the elastic deformation of the interconnecting means as may result from variations in the loads applied thereto. In the simplest embodiment of such an interconnection, the wheel-bearing members comprise a longitudinal or transverse arm rigidly connected to one of the main shafts, the elastic deformability of which contributes only in small measure to the flexibility of the suspension system of this invention. Clearly, however, any other convenient interconnection means may be resorted to without departing from the scope of the invention.

In a first constructional form, the differential reversal device comprises toothed sectors respectively centred upon the axis of, and supported by, the main shafts, and at least one movable gearwheel meshing with said toothed sectors and pivotally mounted on a movable support, for instance about an axis parallel to the main shaft axis in the specific case where said sectors have spur teeth.

Preferably, the movable gearwheel is a compound one consisting of two juxtaposed, preferably co-planar toothed arcs respectively meshing with said two toothed sectors.

In a second form of embodiment, the differential reversal device consists of a system of reciprocal cams over which ride followers supported by levers rigid with the main shafts, said cams being supported by a member pivotally mounted about a shaft connected to said support and parallel with the axis of said main shafts.

The integrated suspension system of this invention can obviously be positioned anywhere between the main shafts. For example, if the main shafts are arranged transversely, a solution which is especially advantageous, the suspension system may be arranged laterally in relation to the longitudinal axis of symmetry.

In comparison with the first, the second form of embodiment of the differential reversal device offers numerous advantages in respect of strength, design flexibilty, manufacturing cost, weight and size, for given applied loads. The latter-mentioned form of embodiment, however, depends upon the type of wheel-bearing members utilized and their disposition relative of the chassis; since the cam followers can transmit loads to the cams only in the direction in which they bear thereagainst, whereas gears will transmit loads in any direction.

In the specific instance where a pair of wheels is disposed on an axis transverse to the chassis, if the suspension members comprise longitudinal arms respectively connected to the main shafts, the common axis of which will necessarily be transverse, the reciprocal cams of the differential reversal device will involve inverse contacts if the locations of the cam followers in relation to their respective cams differ relative to the centre of rotation of the cam system.

Conversely, if in this case the wheel-bearing members comprise transverse arms respectively connected to the main shafts, the common axis of which is always longitudinal, the reciprocal cams of the differential reversal device will involve a similar type of contact: the two cam followers will ride on their cams internally or externally relative to the rotation axis of the cam-supporting member.

In the specific case of a pair of wheels disposed on the same side of the longitudinal axis of the vehicle, the conditions cited precedingly will be reversed: longitudinal arms will involve the same type of cam action, transverse arms inverse cam action.

Lastly, in both forms of embodiment of the differential reversal device, relative movement or movement in unison of the main shafts will result in movements of different kinds for the particular wheels involved, according as the two wheels are arranged transversely or in tandem, and depending also on whether transverse or longitudinal arms are used.

Insofar as wheel movement is concerned, considering more specifically the case of a pair of wheels arranged on an axis transverse to the chassis, then:

(a) with the use of longitudinal wheel-bearing arms, differential motion of the main shafts will correspond to a sideways rolling motion of the wheels relative to the chassis, while rotation in unison of said shafts will correspond to a parallel movement of the wheels connected thereto relative to the chassis, while (b) with the use of transverse wheel-bearing arms, differential movement of the main shafts will correspond to a parallel movement of the wheels, whereas rotation in unison of said shafts will correspond to a sideways rolling motion of the wheels relative to the chassis.

From the foregoing it will be manifest that, in the case of a pair of wheels arranged on an axis transverse to the chassis, in conjunction with the use of longitudinal arms (case *a*), the first set of elastic members provides flexibility in roll and produces reactions in both directions, whereas the second set of elastic members provides pure vertical flexibility and works only in one direction under general operating conditions. Conversely, if in this instance transverse arms were to be used (case *b*), the first set of elastic members would provide vertical flexibility whereas the second set of elastic members would provide flexibility in roll.

It can easily be verified that with the pair of wheels disposed on the same side of the longitudinal axis of the chassis, these results will be reversed.

The possibility of individually selecting the elasticity and damping characteristics of the suspension system for parallel, rolling or pitching motion of the wheels, within a single integrated system, is not the only advantage of the present invention, which embodies other additional features.

The combination of two or more integrated systems in the same chassis makes it easier to seek the best compromise between comfort and roadholding. The elastic members can in fact be provided in many different ways, examples being conventional springs, tortion bars, or pneumatic or better still oleo-pneumatic elements. These latter-mentioned elements were the subject of the U.S. Patent No. 2,984,501 and of the U.S. patent application Ser. No. 286,007 filed by applicant on June 6, 1963, now Patent No. 3,149,831, and assigned to Société Française d'Entretien et de Réparation de Matériel Aéronautique (S.F.E.R.M.A.), the several advantages of which may be combined with those of the present invention.

Similarly, improved roadholding and enhanced comfort when negotiating turns may be sought by a servo-controlled tilting of the chassis inwardly of the turn, and such servo systems are greatly simplified when applied to integrated suspension systems according to the present invention, as will become apparent hereinafter.

In a second preferred embodiment, the suspension system is so devised that the pivotal support and the main shafts, together with the differential reversal device, permit of accommodating mechanical coupling members to shafts connected to the wheels. The main shafts accordingly take the form of tubular shafts through which extend transversely the mechanical coupling shafts to the wheels and which have one of their ends respectively connected to the wheel-bearing members of the pair of wheels, and their other facing ends bearing levers positioned in substantially spaced relation to provide passage for the mechanical coupling means required to transmit, say, a driving or restraining torque to the inner shafts. The free ends of these levers are inserted into the suspension unit pivotal support which is rotatable about the axis common to the tubular shafts and actuate in known manner the movable component of the differential reversal device carried by said pivotal support and which rotates about an axis perpendicular to the axis common to said tubular shafts, the assembly additionally comprising the two sets of damped elastic members which define flexibility of the tubular shafts, respectively for differential rotation and rotation in unison in the same direction thereof.

When this is the case, the levers are circular sector-shaped parts bearing thereon two toothed sectors meshing with a bevel pinion which is the movable component of the differential reversal device.

In a first form of embodiment, the set of damped elastic members controlling rotation of said bevel pinion is a set of torsion bars arranged parallel with the axis of the pinion and distributed symmetrically thereabout. One end of each bar engages with a set of spur teeth coaxial and rigid with said bevel pinion, while its other end is secured to a housing which contains the suspension members, which housing is integral with the pivotal support and bears a double-acting hydraulic damping device rigidly connected to the shaft common to the pinion and the set of spur teeth. This assembly defines flexibility in differential motion of the tubular shafts.

In a second form of embodiment, the set of damped elastic members defining such flexibility in differential motion is a double-acting oleo-pneumatic device with dual opposed elastic media, having its rod connected through a lever to the bevel pinion shaft and being itself secured directly or indirectly to the pivotal support.

The second set of elastic members defining flexibility of the tubular shafts for motion thereof in unison in the same direction may then consist, for instance, of a single-acting oleo-pneumatic device having one of its ends bearing against the chassis and its other end against the pivotal support of the suspension unit.

In accordance with a further specific feature of this invention, the second form of embodiment of the suspension system may comprise sideways tilt control means as in the first form of embodiment.

Such control means may operate, for example, by bodily rotating, within their housing, the torsion bars distributed about the bevel pinion shaft and may consist of a hydraulic or electric motor which, through a worm-and-wheel and suitable reduction gear, drives the anchor plate of said torsion bars constituting the elastic roll coupling. Alternatively, said control means may consist of a double-acting hydraulic actuator whose rod is operatively applied to said anchor plate with the appropriate mechanical advantage.

In the specific case where the elastic members controlling rotation of the bevel pinion consist of a double-acting oleo-pneumatic device with dual opposed elastic media, a suitable transfer of liquid between the inversely deformable cavities of such a doubel-acting oleo-pneumatic device will enable the position of equilibrium of the suspension system to be modified laterally, as already stated with reference to the first form of embodiment.

The description which follows with reference to the accompanying non-limitative exemplary drawings will give a clear understanding of how the invention can be carried into practice and will disclose still further features thereof.

Figures 17, 18A, 18B:
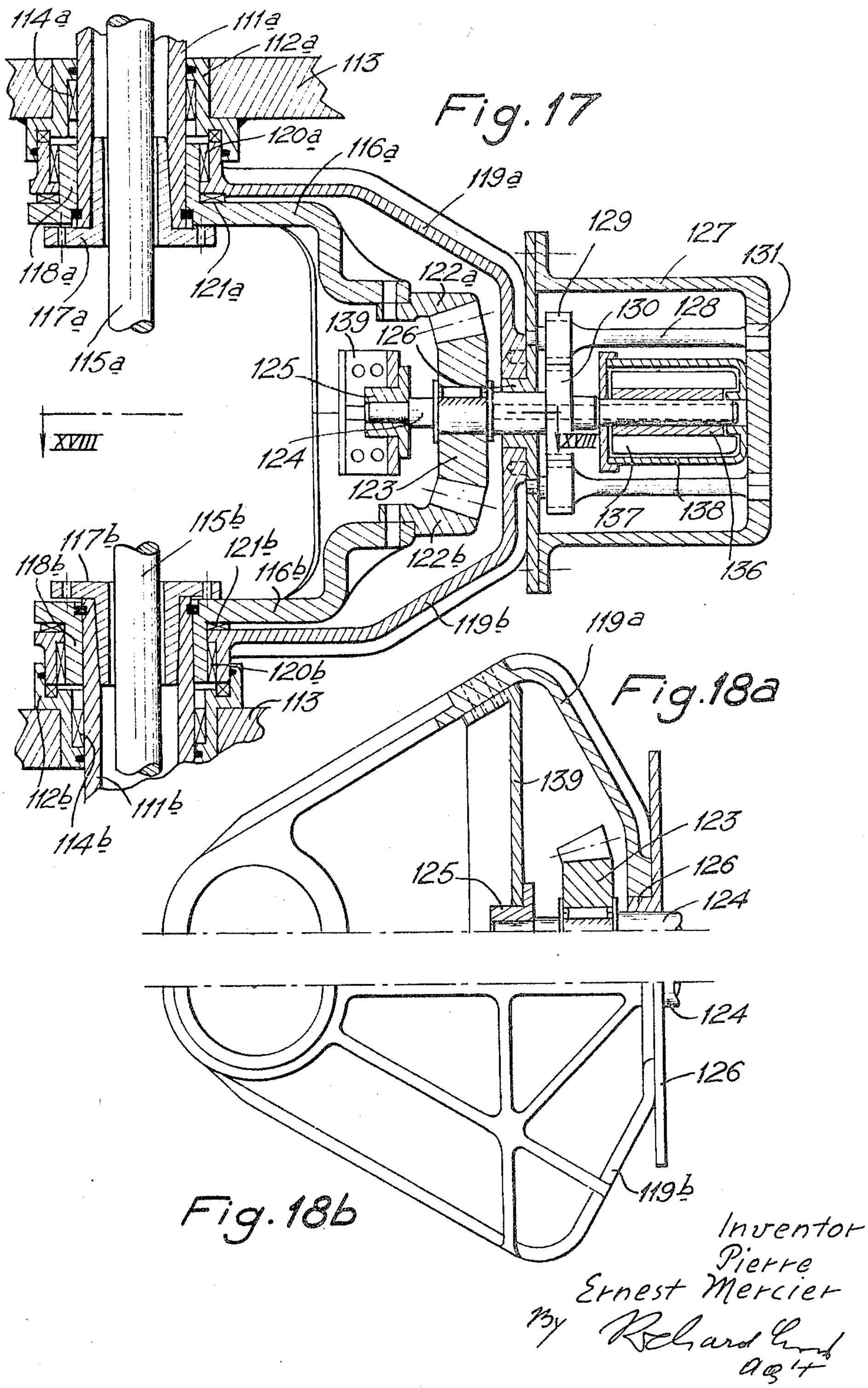
FIG. 17 is a sectional view, along a plane passing through the axis common to the two tubular shafts, of an alternative form of embodiment of a suspension system according to the invention.
Figure 20:
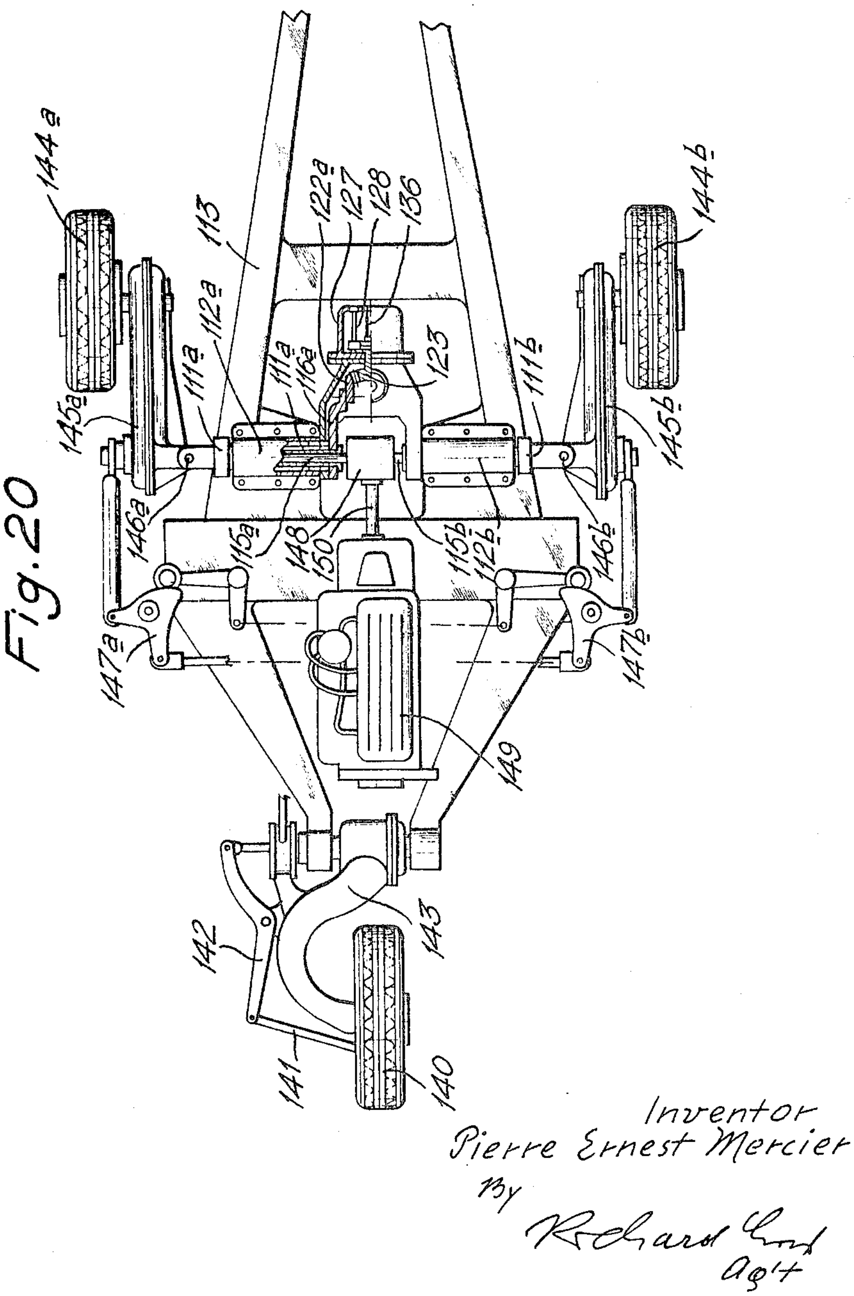
Figures 23, 24, 25:
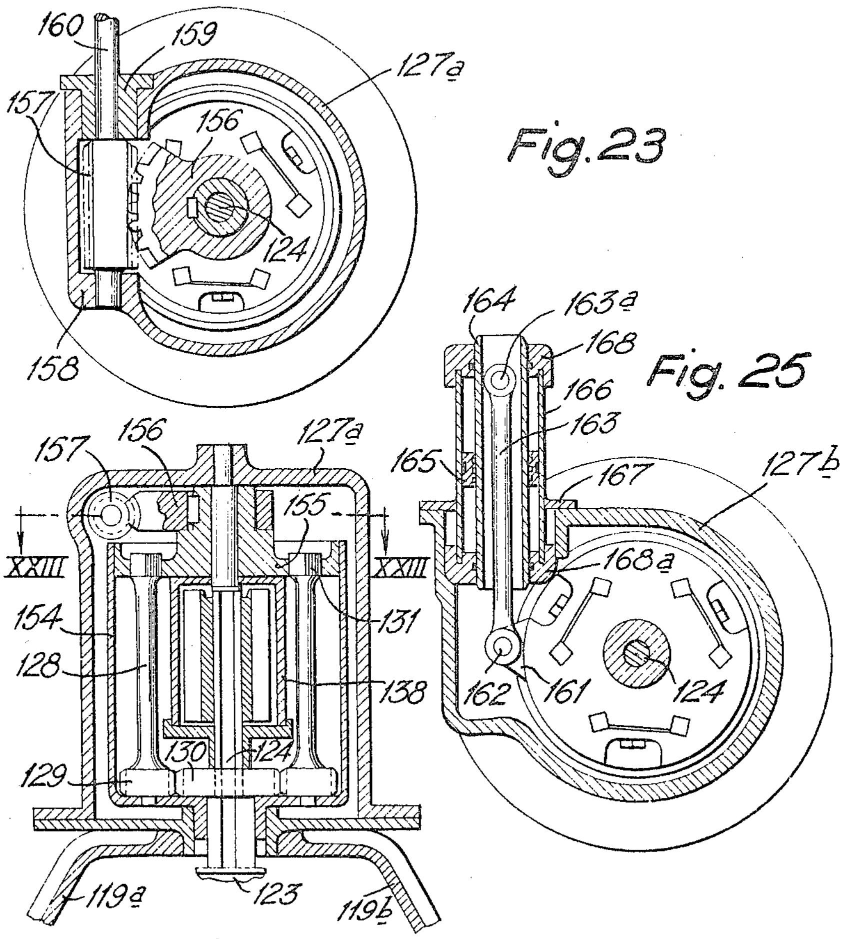
Figure 26:
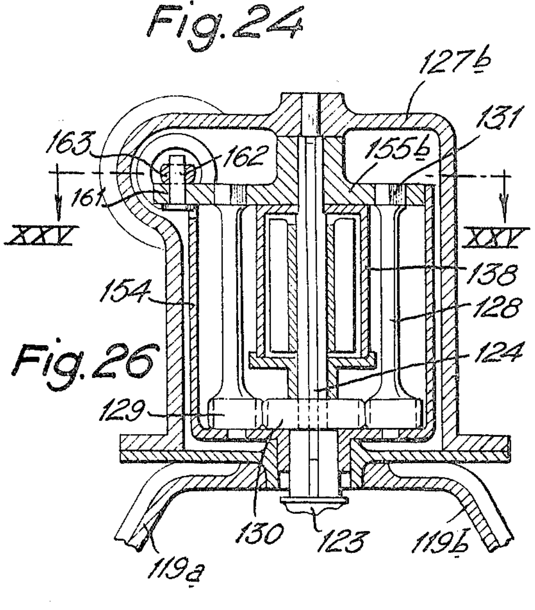
Figure 28:
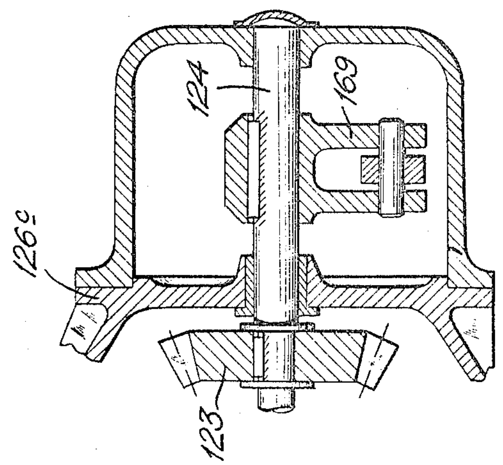
Figure 27:
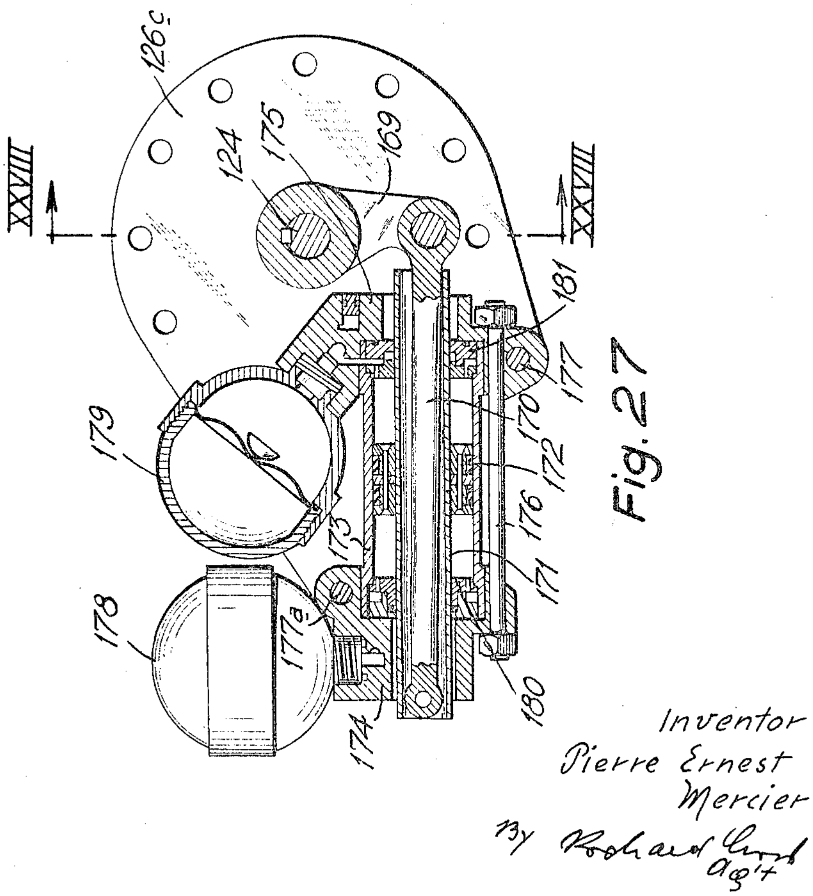

FIG. 18*a* is a fragmental half-section through the line XVIII—XVIII of FIG. 17, the tubular shafts and the internal shafts, together with the assembly elements thereof, being omitted;

FIG. 18*b* is a fragmental external half-view of the system as seen from a direction perpendicular to the plane of FIG. 17, the tubular shafts and the internal shafts together with their assembly elements being omitted;

FIG. 19 is a top view of the housing containing the damped elactic members controlling the rotation of the bevel pinion of FIG. 17;

FIG. 20 is a schematic plan view of a motor vehicle chassis of which a central pair of wheels is equipped with a suspension system of the kind shown in FIG. 17;

FIG. 21 is a side elevation view in fragmental section of the central portion of FIG. 20, showing the set of damped elastic members assigned to rotation in unison of the tubular shafts;

FIGURE 22 is a partial plan view of FIG. 21;

FIGS. 23 and 24 show, in section through the line XXIII—XXIII of FIG. 24 and in diametrical section, respectively, a sideways tilt control system adapted to the suspension system of FIG. 17;

FIGS. 25 and 26 show, in section through the line XXV—XXV of FIG. 26 and in diametrical section, respectively, another form of embodiment of a sideways tilt control system applied to the suspension system of FIG. 17;

FIG. 27 shows, in partial plan view and partial section, an oleo-pneumatic roll coupling comprising a liquid-transfer-type sideways tilt control system adapted to the suspension system of FIG. 17; and FIG. 28 is a sectional view taken through the line XXVIII—XXVIII of FIG. 27.

Figures 1, 2, 3:
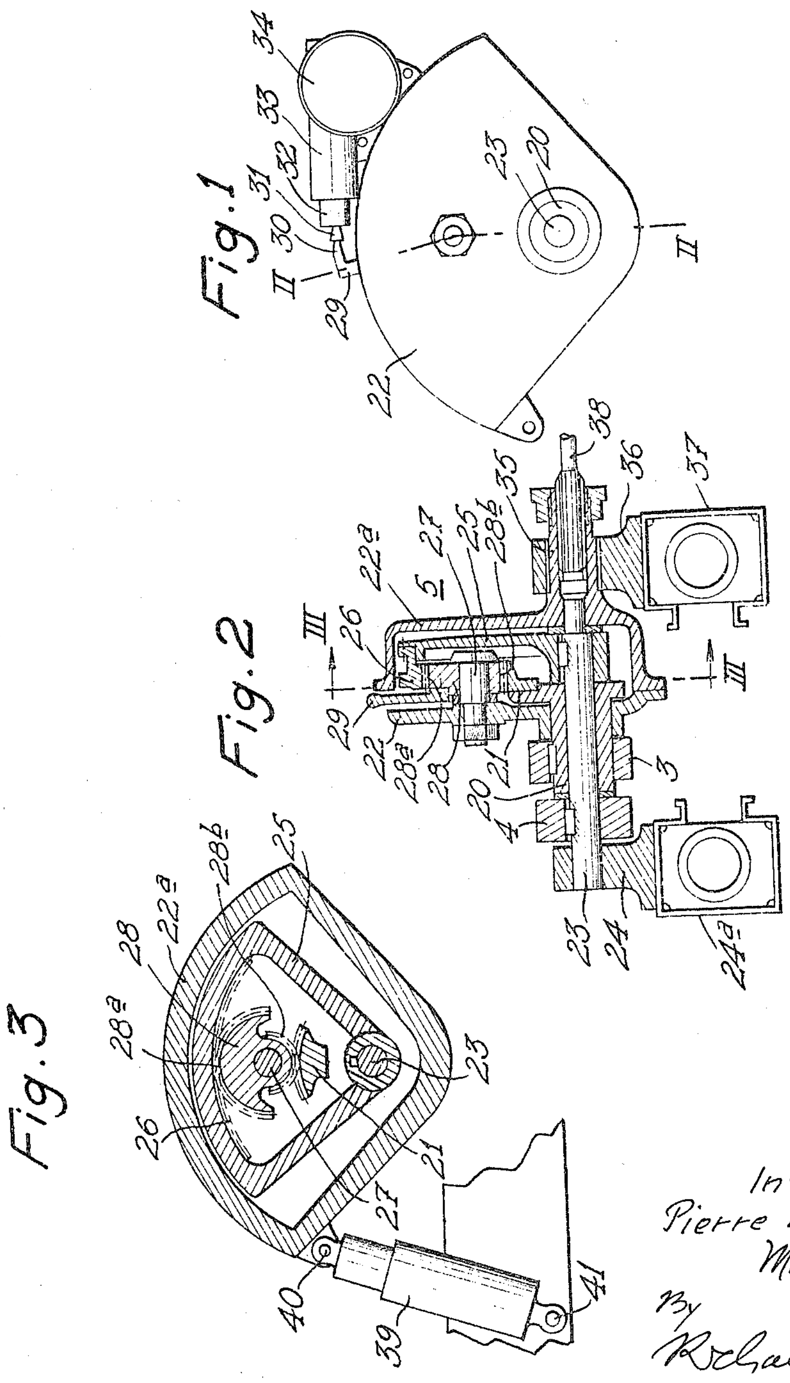
FIG. 1 is an external view of a first embodiment of the reciprocal differential reversal device of the invention, only the set of elastic members corresponding to pure vertical flexibility being shown.
FIG. 2 is a section through the line II—II of FIG. 1, showing the reciprocal differential reversal device mounted on a vehicle.
FIG. 3 is a section taken through the line III—III of FIG. 2.

Referring to the drawings, FIGS. 1 to 3 show a first embodiment of the differential reversal device. A transverse arm 3 supporting one wheel of the pair thereof is keyed to a sleeve 20 rigid with a toothed sector 21 contained in a two-piece housing **22–22*a*. Through said sleeve extends a shaft 23 supported in a bearing 24 and to which is keyed the second transverse arm 4 supporting the other wheel. To said shaft 23 is additionally keyed a sector-shaped part 25 contained in the housing 22–22*a* and bearing on its extremity a toothed sector 26. The sleeve 20 and the shaft 23 constitute the main shafts of the suspension system, and the housing 22–22*a*** is rotatable about said sleeve and said shaft.

The part 22 carries a shaft 27 about which is pivotally mounted a planet gear 28 having two distinct sets of teeth **28*a*, 28*b* (see FIGS. 2 and 3) which mesh with toothed sectors 21 and 26** respectively.

At the top of the housing **22–22*a* is provided an opening permitting oscillation of a part 29 rigidly connected to planet gear 28 and bearing a knife-edge 30. The latter coacts with the link 31 of the hollow rod 32 of a single-acting oleo-pneumatic device 33 having a pneumatic chamber 34, said oleo-pneumatic device being rigidly connected to the housing 22–22*a*** (FIG. 1) and being described in greater detail hereinafter with reference to FIG. 4.

Through the medium of its part **22*a* which comprises a hollow cylindrical extension 35 engaging into a bearing 36 fixedly secured to a chassis member 37, said housing 22–22*a* is rigidly united with a torsion bar 38 constituting the other elastic coupling of the suspension system according to this invention (FIG. 2). The motion of the bar 38, which is fixed to the chassis at its other extremity (not shown), is damped by a symmetrically double-acting damper 39 secured to the housing 22–22*a* by a pin 40 and to the chassis by a pin 41** (FIG. 3). This damper will be described in greater detail hereinbelow with reference to FIG. 4.

The system hereinbefore described operates in the following manner:

If the two wheels in the pair thereof herein considered move in unison toward or away from the ground, they rotate the toothed sectors 21 and 26 which in turn rotate the planet gear 28 via its teeth **28*b* and 28*a*, respectively, against the countering effect of the single-acting damper 33**.

Conversely, if the wheel rigid with the arm 3 moves away from the ground its arm 3 rotates the sleeve 20 and, with it, the toothed sector 21, in a clockwise direction, thereby causing the toothed sector 26 to be rotated anticlockwise via the planet gear 28. This in turn causes the arm 4 keyed to the shaft 23 to move the wheel it supports nearer to the ground, while the housing **22–22*a* rotates about the axis common to the shaft 23 and the sleeve 20, the motion being damped by the double-acting damper 39 and the torsion bar 38**.

Figure 4:
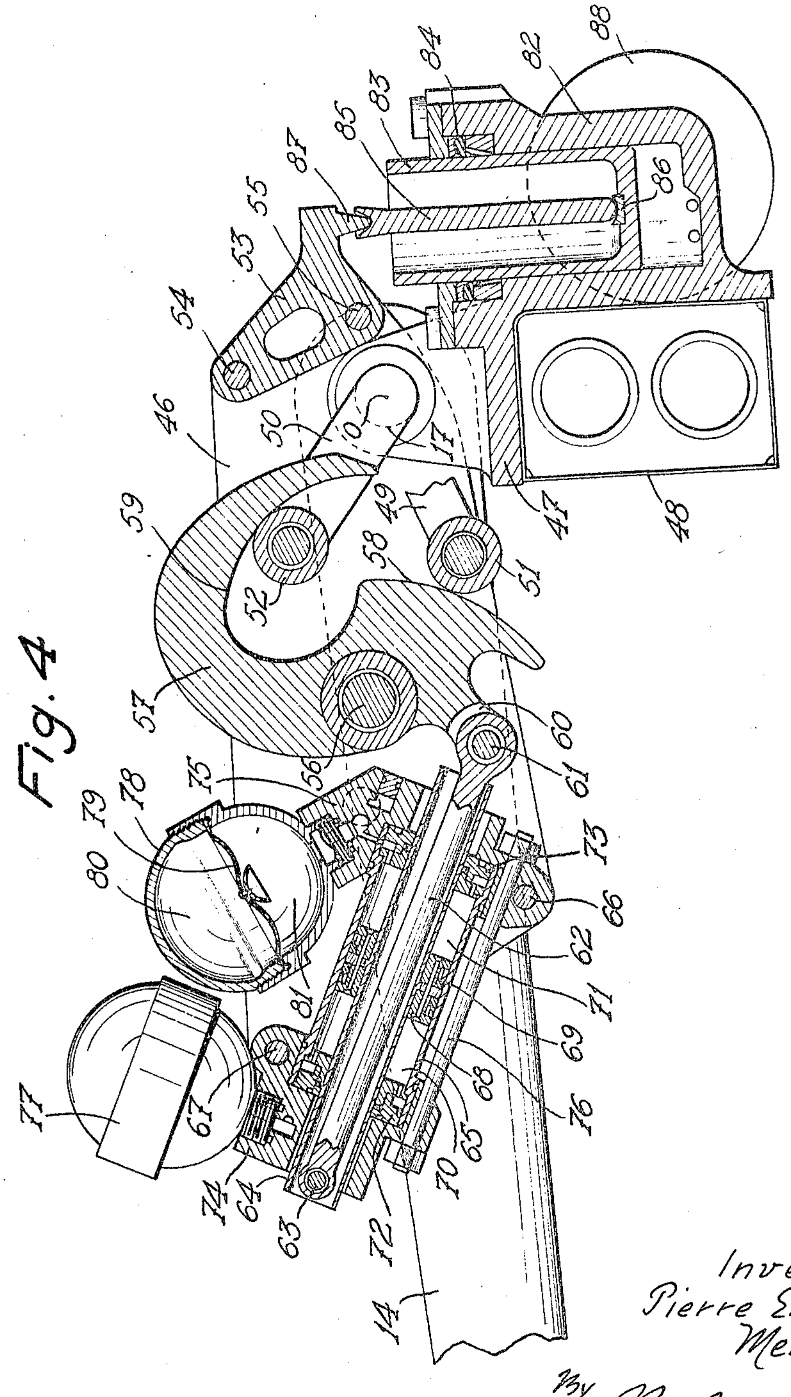
FIG. 4 is a sectional view of a second form of embodiment of the differential reversal device.

The differential reversal device shown in FIG. 4 comprises a support 47 secured to a chassis cross-member 48. On this support are rotatable, about the axis O, the main shafts 16 and 17 which bear on their extremities levers 49 and 50, respectively, which carry cam followers 51 and 52. About the axis O is also pivotally mounted a support 46 consisting of two similar plates interconnected by a part 53 and rods 54 and 55. To the support 46 is pivotally connected about a shaft 56 a cam element 57 having formed thereon two respectively convex and concave cam contours 58 and 59 over which ride the cam followers 51 and 52 respectively. In the specific example illustrated , the cam contours 58 and 59 are roughly circular.

The extension 60 of the cam element 57 supports a pin 61 to which is pivotally connected a rod 62 the other end of which is pivotally connected at 63 to a hollow piston rod 64 sliding through the cylinder 65 of a hydropneumatic device connected to said support 46 by means of pins 66 and 67.

Within the cylinder 65 is slidable a piston 68 supported by the rod 64 and fitted with fluid-tight seals 69, and said piston defined two reciprocally deformable cavities 70, 71 sealed off at each end of the cylinder by end closures 72, 73, shown with their fixed seals. The endpieces 74, 75 are interconnected by rods 76 and serve as supports for the pneumatic chambers 77, 78 which counter the movement of the piston 68 through the medium of the liquid in the cavities 70, 71.

Each pneumatic chamber 77 and 78, which are of the type described in the patent and patent application cited precedingly, comprises a diaphragm 79 which separates a cavity 80 containing an elastic medium such as air under pressure from a cavity 81 containing the liquid used for operation of the double-acting damper 65. The manner of operation of these chambers need not be described anew, nor that of the damping members inserted between the liquid contained in the cavities 81 and acted upon by the gas media in the cavities 80 of pneumatic chambers 77 and 78, through the medium of the segregating diaphragms 79.

The second hydropneumatic device comprises a cylinder 82 integral with the support 47. Within the cylinder 82, a hollow piston 83 is slidable through fluid-tight seals 84 under the urge of a link 85 bearing against the bottom of the piston at 86 and against a knife-edge 87 rigid with the part 53 interconnecting the pivotal-support plates 46. The pneumatic chamber 88 is of the same type as the chambers 77 and 78 and is positioned behind the cylinder 82, being secured thereto rearwardly of the plane of the figure.

Figure 5:
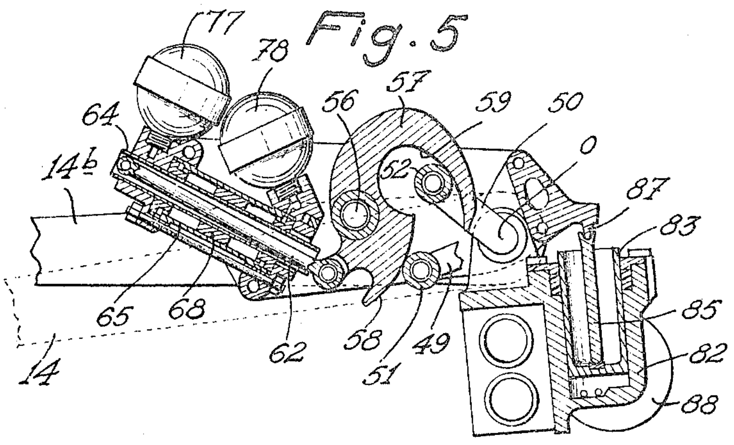
FIG. 5 shows the manner of operation of the differential reversal device of FIG. 4 in response to movement of the two wheels in unison in the same direction.

The system described hereinabove operates in the following manner:

Assuming that in the position of FIG. 4 the wheel-bearing arms 13 and 14 are located at the same level with respect to the chassis, then if the wheels 11 and 12 (FIG. 15) are caused to move in unison through the same angular distance about the axis O away from the ground, the followers 51 and 52 supported by the levers 49 and 50 rigid with said arms and riding over the cam contours 58 and 59 will cause the support 46 on which the cam element 57 is mounted to pivot about about the axis O without said element 57 moving relative to said support. Only the piston 83 of the second hydropneumatic device will be thrust into the cylinder 82, causing the suspension system to assume the configuration shown in FIG. 5 wherein the arm 14 has shifted from its original position shown in broken lines to a position **14*b* shown in solid lines. This likewise applies to the arm 13. Thus, in this case, the hydropneumatic device 82, 83** determines the vertical flexibility, or the flexibility when the two transversely disposed wheels move in unison in the same direction.

Figure 6:
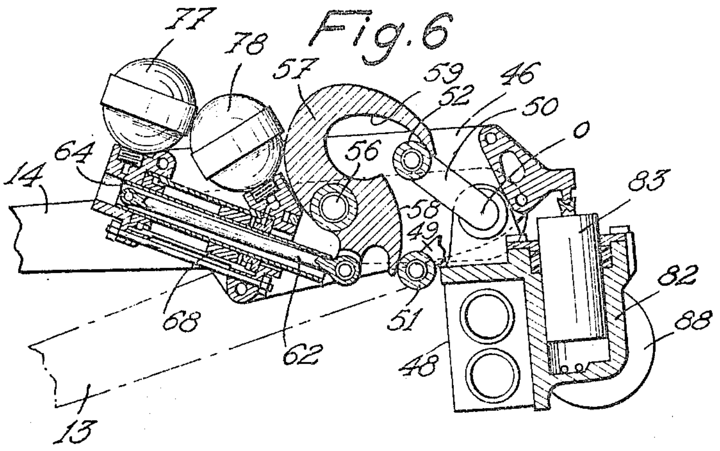
FIGS. 6 and 7 show the manner of operation of the differential reversal device of FIG. 4 in response to differential movement of the two wheels in opposite directions.

Conversely, if the wheel 12 connected to the wheel-bearing arm 14 alone tends to move away from the chassis (FIG. 6) by a clockwise motion about the axis O, then the lever 50 which is rigid with the main shaft 17 to which the arm 14 carrying said wheel 12 is fixed will also rotate clockwise about the axis O and its cam follower 52 riding in pressure contact over the concave cam contour 59 will swivel the cam element 57 in an anticlockwise direction about the shaft 56. This causes the convex cam contour 60 to simultaneously displace the follower 51 which, through its lever 49, rotates the wheel-bearing arm 13 in the opposite direction to the wheel-bearing arm 14, as shown in dot-dash lines in FIG. 6, thereby moving the wheel 11 towards the ground. At the same time, the link 62 pulls the hollow rod 64 and the piston 68 toward the cross-member 48, as shown in the figure. In this case, the support 46 and the second hydropneumatic device comprising the hollow piston 83 and the cylinder 82 remains stationary.

Figure 7:
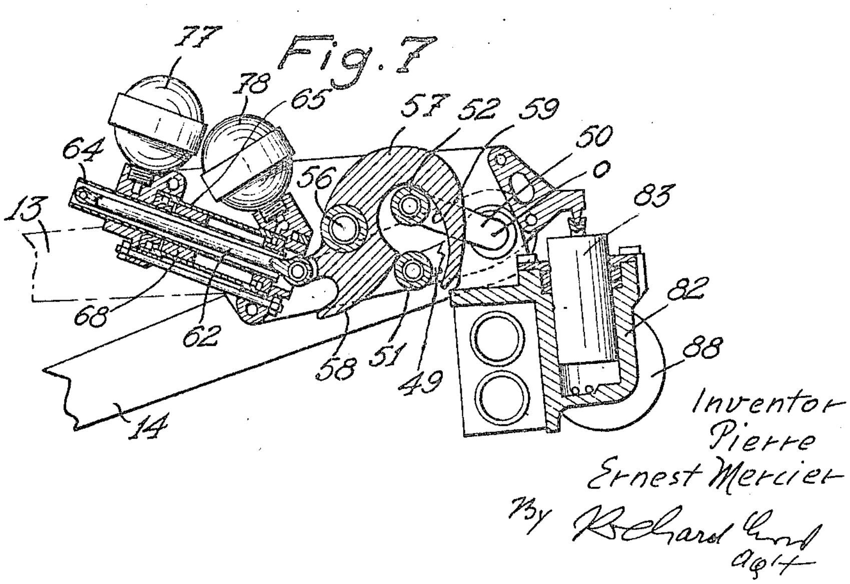

If the wheel 12 tends to move toward the ground, the movements of the various parts are reversed, giving the configuration of FIG. 7 wherein the wheel 11 is caused to move away from the ground by the shift of its supporting arm 13 to the position shown in dot-dash lines. In these two latter-mentioned cases, the hydropneumatic device 65 determines the differential flexibility of the main shafts in roll, with the pneumatic chambers 77 and 78 operating in mutual opposition.

The differential clockwise upward rotations of the arms 13 and 14 are of smaller amplitude than their corresponding downward rotations, so that the chassis is elevated slightly when it tilts sideways. This is favourable for the suspension, particularly when a servo-control system tilts the chassis toward the inside of a bend and leaves the inside wheel with sufficient residual upward movement.

Figure 8:
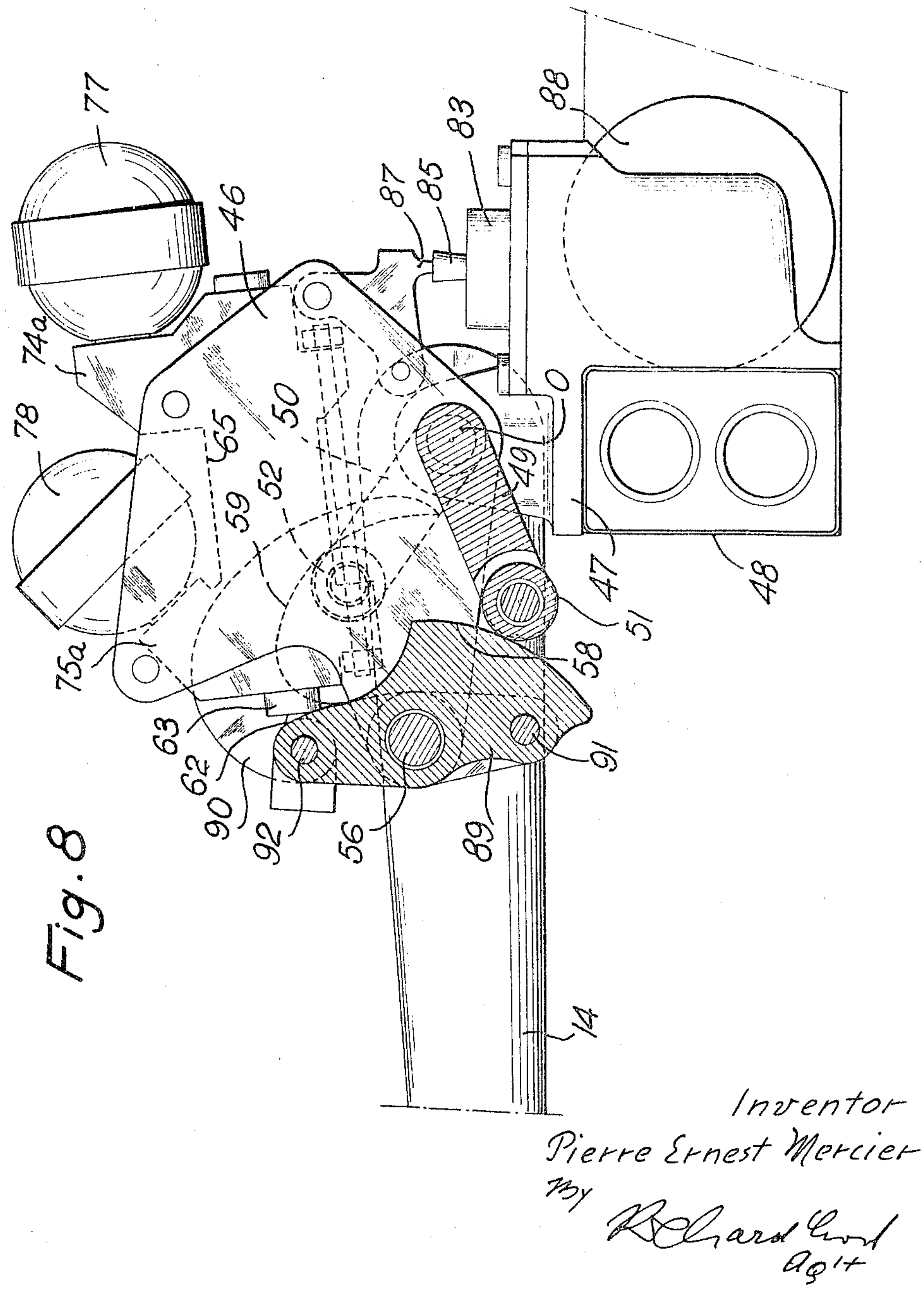
FIGS. 8 to 10 show three alternative embodiments of a differential reversal device of the kind shown in FIG. 4.

The form of embodiment shown in FIG. 8 differs from that of FIG. 4 only by the design of the cams and the disposition of the first hydropneumatic device. The cams lie in distinct parallel planes, and the convex cam contour 58 on which rides the follower 51 carried by the lever 49 is formed on a part 89, while the concave cam contour 59 against which bears the follower 52 carried by the lever 50 is formed on a part 90. Both the parts 89 and 90 are rotatable about the common shaft 56 and interconnected by pins 91 and 92. To the pin 92 is also pivotally connected the link 62 driving the hollow piston rod 64 of the hydropneumatic device 65 which is positioned above the shaft O and provided with connecting end-pieces **74*a* and 75*a* to the pneumatic chambers 77 and 78. One of the plates of support 46 is positioned intermediate the parts 89 and 90**. The remaining components bear like numerals to their counterparts in FIG. 4, and the manner of operation of the system is exactly as described with reference to that figure.

Figure 9:
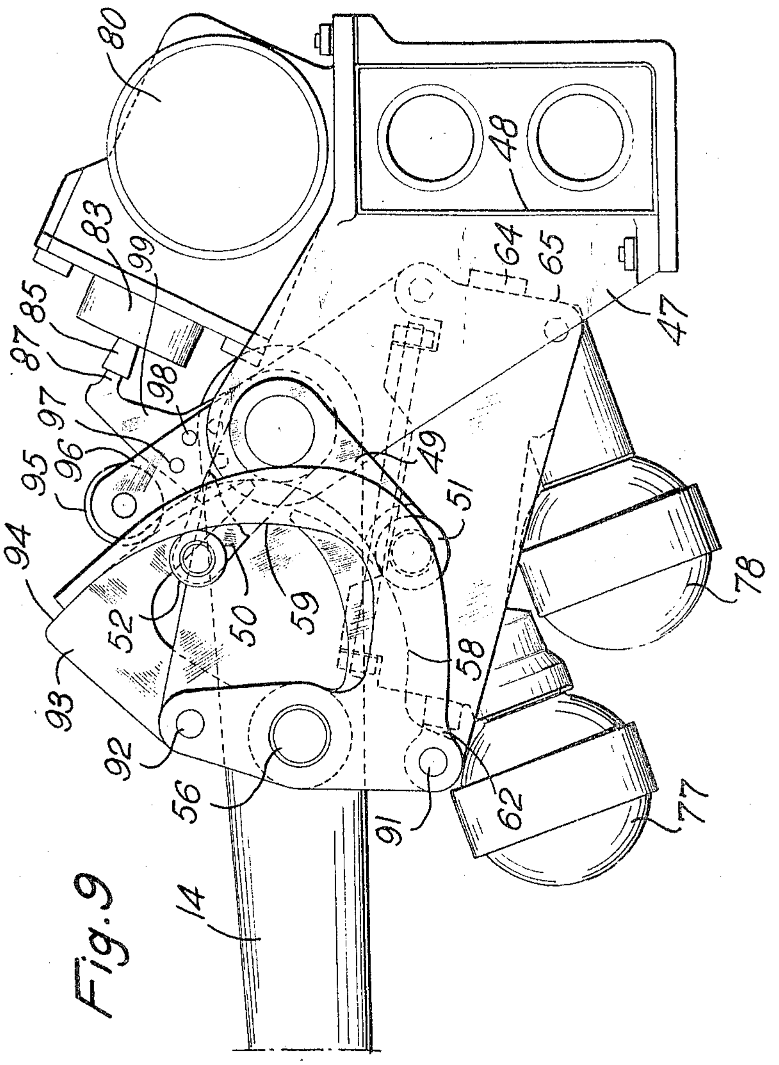

FIG. 9 shows an alternative arrangement based on that of FIG. 8, except that the contours of the reciprocal cams 58, 59 correspond to the case where the differential movements of the main shafts 13, 14 are symmetrical in both directions.

Elevation of the vehicle when it tilts sideways is obtained in this specific instance by means of an auxiliary intermediately fulcrumed cam 93 whose active cylindrical face 94 contacts a follower 95 carried by a lever 96 which is freely rotatable about the shaft O and rigidly connected by bolts or rivets 97, 98, to the body 99 of the knife-edge 87 bearing against the end of the link 85.

The system described above operates as follows:

Since the active arc 94 of the auxiliary cam 93 has a smaller radius of curvature than a circular arc centred on the shaft 56 and tangential to the follower 95 when the same is in its resting position shown in FIG. 9, it will be seen that rotation of the reciprocal cams 58, 59 and the auxiliary cam 93 rigid therewith will cause the follower 95 to recede from the shaft 56, thereby causing the support 46 to rotate and to consequently lower the arms denoted by numeral 14, thus elevating the vehicle when it tilts sideways. It will be observed that, by reason of the arrangement of the reciprocal cams 58, 59 and the followers 51, 52 riding thereon, a free space is provided within the main shafts 16, 17 for accommodating elements not forming part of the suspension system, as shown in dot-dash lines in FIG. 14.

Figure 10:
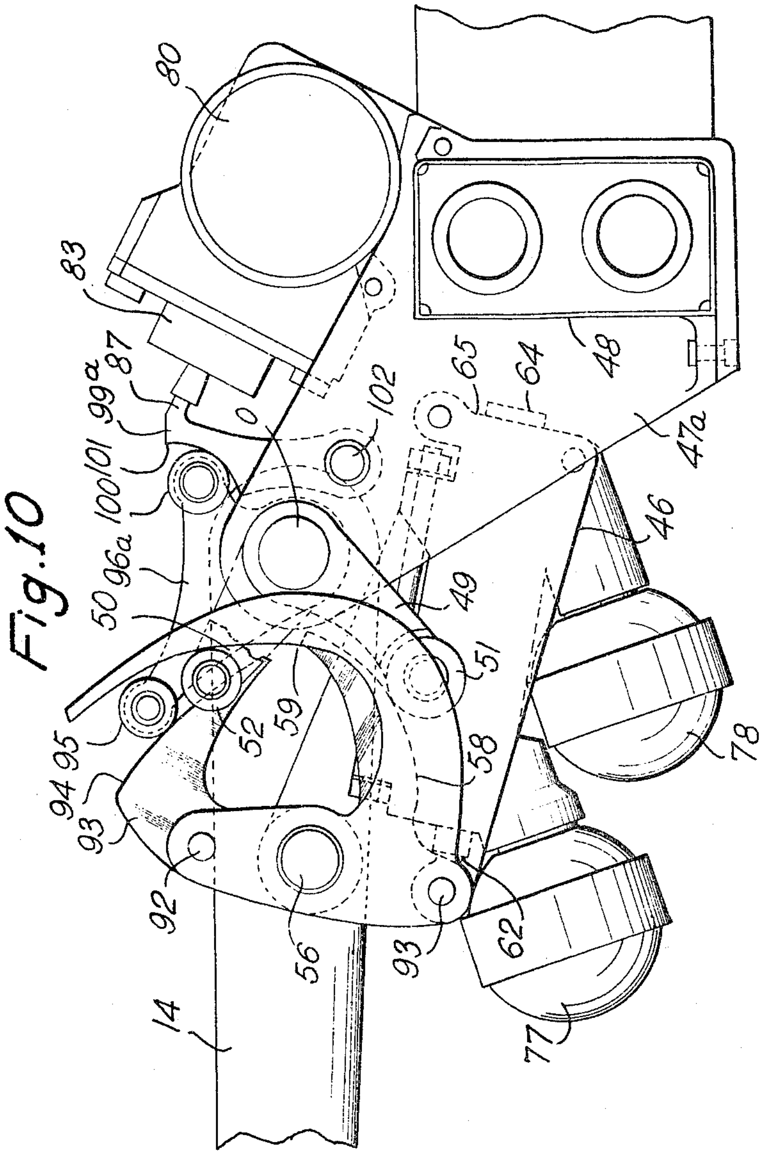

FIG. 10 reproduces the general arrangement of FIG. 9, except that the cam 93 with its active face 94 and the follower 95 riding thereon occupy different positions. The lever **96*a* carrying the follower 95 is shaped differently and carries a second follower 100 and is no longer directly rigid with the body 99*a* of the knife-edge 87**.

The body **99*a* has a concave cam contour 101 formed thereon facing the follower 100, and said body is pivotally connected about a shaft 102 to the part 47*a* integral with the chassis. The functions of the follower 95 and of its lever 96 rotatable about the axis O of the main shafts remain unchanged but are supplemented by the cooperation of the follower 100 with the end-fulcrumed concave cam 101, the effect of which is to reduce the strength with which the lever 96*a* is applied against the body 99*a* of the knife-edge 87 when the support 46** rotates clockwise about the axis O as the result of a parallel elevation of the wheels relative to the ground. It will therefore be manifest that by suitably choosing the shapes and operative angles of the components referred to precedingly, it is easy to avoid any shock for the wheel-bearing arms in the region of their upper limit positions.

Figure 11:
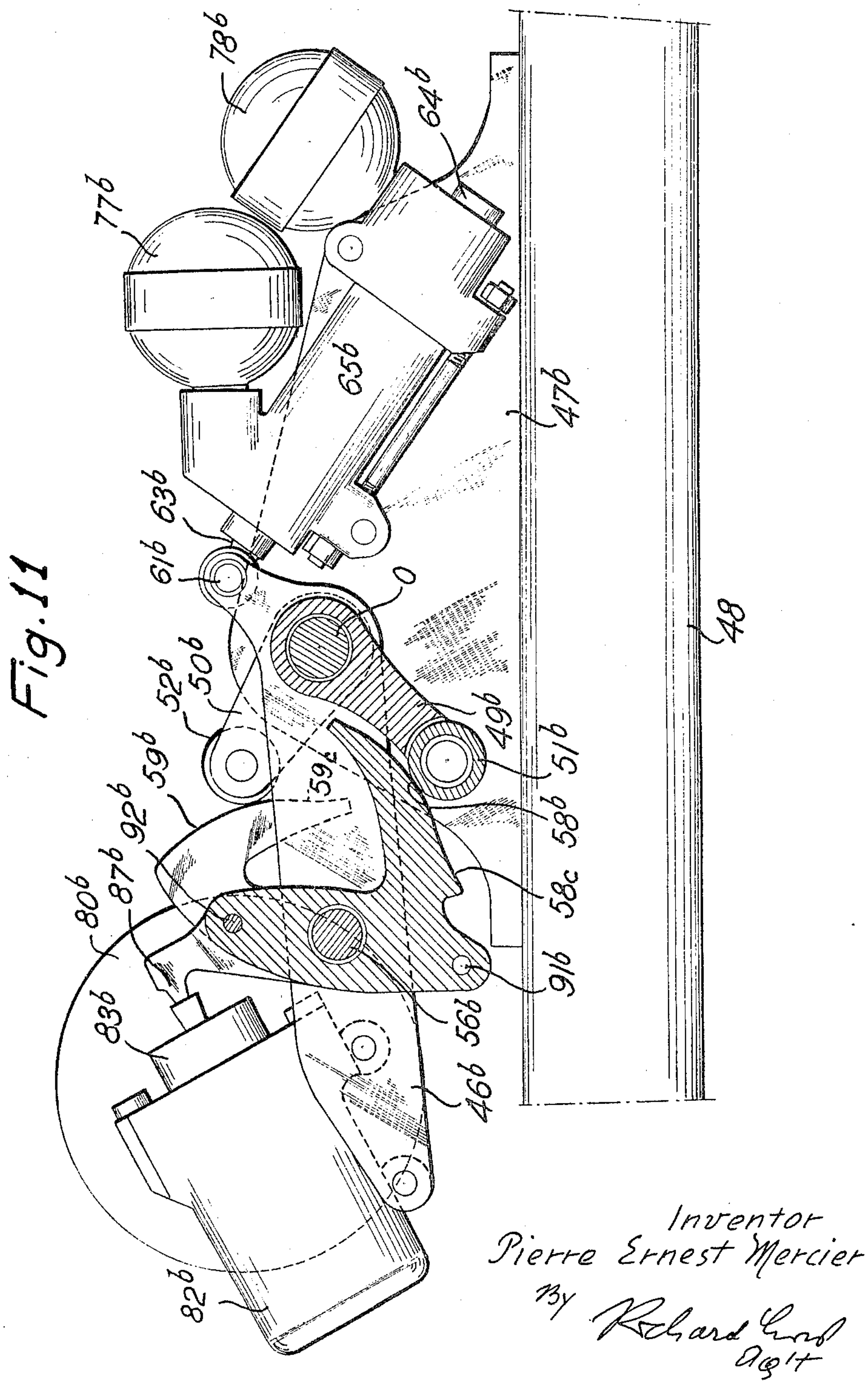
FIG. 11 is an alternative constructional form of a differential reversal device of the kind shown in FIGS. 1 to 3.

FIG. 11 shows in sectional side elevation an arrangement similar to that of FIGS. 1 to 3, in which the differential device is provided by two similarly contacted reciprocal cams **58*b*, 59*b* with which drivingly cooperate levers 49*b*, 50*b* carrying followers 51*b*, 52*b* and rigidly united with the main shafts, one of which surrounds the other as shown in the figures, in conjunction with the use of damped elastic couplings, both of the oleo-pneumatic type. The double-acting elastic coupling 65*b* in this case performs the function of the torsion bar of FIGS. 1 to 3, and is likewise inserted between the chassis and the reciprocal cam supporting element 46*b*** which is represented schematically by two parallel plates arranged on either side of said oleo-pneumatic damped elastic couplings.

Toward one of their ends, the reciprocal cams **58*b*, 59*b* have a compound curvature at 58*c* and 59*c*** in order to reduce the lever arm with which each is acted upon by its corresponding cam-follower-carrying lever. This form of embodiment prevents any shock for the wheel-bearing arms as they reach the upper limit of their travel. The remaining parts bear like reference numerals to their counterparts in FIG. 4, followed by the letter *b*.

Figures 12, 14:
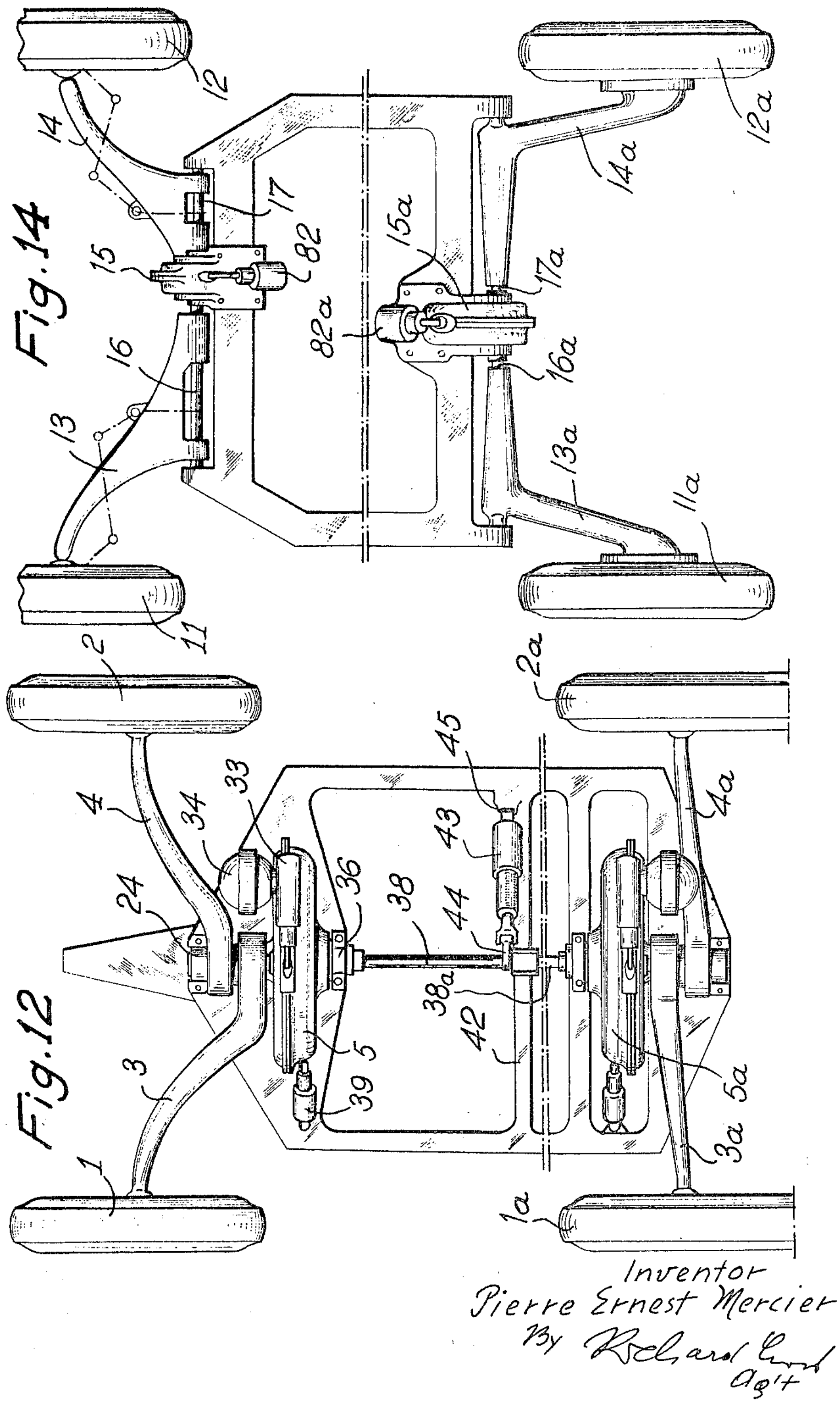
FIG. 12 is a diagrammatic illustration of a vehicle chassis fitted with two pairs of wheels arranged on two axes transverse to the vehicle and equipped with transverse arms pivotally connected to a longitudinal shaft and cooperating with a reciprocal differential reversal device of the kind shown in FIGS. 1 to 3 and 11.
FIG. 14 shows the chassis fitted with two pairs of transversely mounted wheels equipped with longitudinal arms pivotally connected to transverse shafts and cooperating with enclosed differential reversal devices of the kind shown in FIGS. 4 to 10.

The suspension system shown in FIG. 12 comprises, in respect of each pair of wheels 1 and 2 positioned on an axis transverse to the chassis, transverse wheel-bearing arms 3 and 4 connected to the wheel hubs and rotatably mounted about a common longitudinal axis, said arms being associated to a different reversal device 5 of the type shown in FIGS. 1 to 3 and 11. The same arrangement is used for the rear wheels, like components bearing like reference numerals followed by the letter *a*.

In the arrangement of FIG. 12, the torsion bars providing the elastic roll coupling for the front and the rear of the vehicle are mutually aligned and respectively designated 38, 38*a*. These torsion bars are anchored to a chassis cross-member 42. In a preferred form of embodiment, said torsion bars may be interconnected at point vertically aligned with the cross-member 42 which receives the anti-roll torque and transmits it to the chassis, in order to permit inclusion of a sideways tilt servo-control system operating by a torque applied through a double-acting actuator 43 which is connected between a lever 44 rigid with the torsion bars and a pin 45 securing it to the chassis.

The two torsion bars 38, 38*a* can be actuated by the lever 44 either directly or through an apportioning member providing a limited differential rotation of the bars with respect to each other in order to ensure stress-free warping of the quadrilateral defined by the wheel contact points on the ground.

Figure 13:
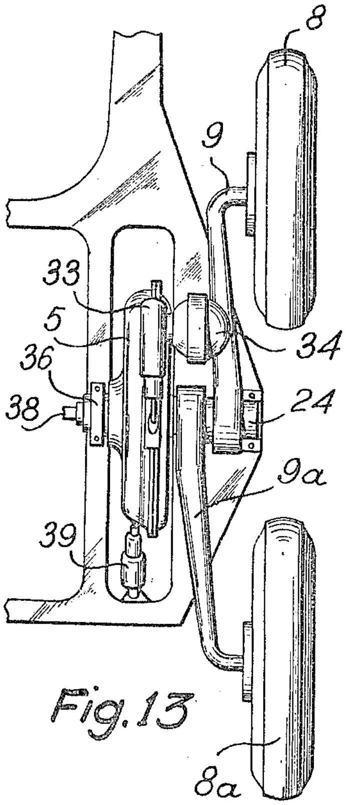
FIG. 13 is a diagrammatic illustration of one of two pairs of tandem wheels arranged on each side of a chassis and equipped with longitudinal arms pivotally connected to a transverse shaft and cooperating with a differential reversal device of the same kind as that of FIG. 12.

In the arrangement shown in FIG. 13, the suspension system according to the invention is applied to two pairs of tandem wheels 8, 8*a* arranged on either side of the chassis. These wheels are supported by longitudinal arms 9, 9*a* rotatable about a common transverse axis and cooperating with a differential reversal device 5 of the type described with reference to FIGS. 1 to 3 and 11.

Figure 15:
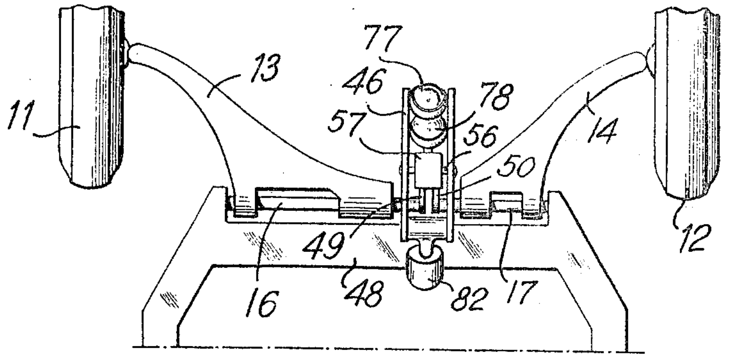
FIG. 15 is an arrangement similar to that of FIG. 14, showing the differential reversal device.

In FIG. 14, the two front wheels 11 and 12 are arranged on an axis transverse to the chassis and supported by longitudinal arms 13 and 14 rigidly connected to transverse main shafts 16 and 17, respectively, cooperating with a differential reversal device 15 of the type described with reference to FIGS. 4 through 10. In the rear wheel layout, like reference numerals are used followed by the letter *a*. Reference to FIG. 14 shows that the various component parts of the differential reversal devices are almost entirely enclosed in a housing. FIG. 15 differs from FIG. 14 only in that the housing for the differential reversal device associated to the wheels 11 and 12 is replaced by a U-shaped support 46.

Figure 16:
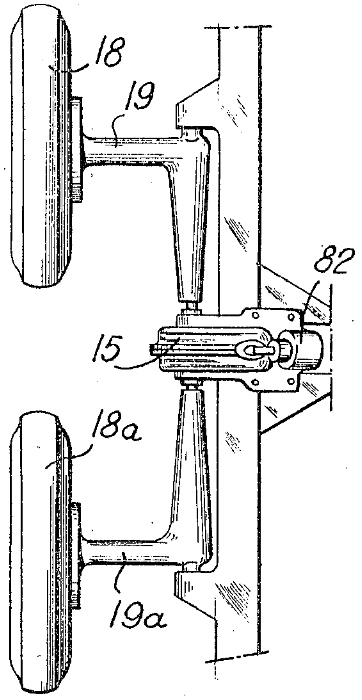
FIG. 16 shows diagrammatically the arrangement of a pair of wheels aligned in tandem on one side of the chassis and equipped with longitudinal arms pivotally connected to a transverse shaft and associated to a differential reversal device of the kind used in FIG. 14.

In the arrangement shown in FIG. 16, two tandem wheels 18 and 18*a* arranged on one side of the chassis in longitudinal alignment are shown as being supported by transverse arms 19 and 19*a* rigid with main shafts aligned upon a common longitudinal axis and cooperating with an enclosed differential reversal device 15 of the type described with reference to FIGS. 4 through 10.

Control of the equilibrium point in differential wheel movement, as well as sideways tilt of the vehicle, can both be ensured in longitudinal equilibrium or lateral inclination by a servo-actuator or wheel deflection corrector by transferring liquid between the two inversely deformable cavities 70 and 71 of the symmetrically-opposed-action oleo-pneumatic device which determines the differential flexibility in roll or in pitch, in the manner well known per se.

The said inversely deformable chambers, similarly assigned for the same type of differential rotation of the wheel-bearing members, can be directly interconnected and fed by the same circuit for correcting the attitude of the vehicle or for servo-controlling its inward inclination in a bend, as is already well known.

In the form of embodiment shown in FIGS. 17 through 22, the integrated suspension system comprises two tubular shafts 111*a* and 111*b* rotatably mounted in two bearers 112*a* and 112*b* rigid with the chassis 113, through the medium of two anti-friction bearings 114*a* and 114*b*. Through said two tubular shafts extend two shafts 115*a*, 115*b* for transmitting a driving or restraining torque. Over said tubular shafts are positioned two circular sector-shaped lever-like parts 116*a*, 116*b* which are retained by two taper bushes 117*a* and 117*b*. About the tubular ends 118*a*, 118*b* of these two circular sector-shaped parts is pivotally mounted a two-part housing 119*a*–119*b* through the medium of anti-friction bearings 120*a*, 120*b*. This housing performs the function of the pivotal support used in the constructional forms described precedingly. Further anti-friction bearings 121*a*, 121*b* are inserted between the sides of the housing and said circular sector-shaped parts.

On the periphery of the circular sector-shaped parts 116*a*, 116*b* are mounted toothed sectors 112*a*, 112*b* meshing with a bevel pinion 123 keyed to a shaft 124 perpendicular to the axis common to tubular shafts 111*a*, 111*b*. This pinion constitutes the movable component of the differential reversal device. The shaft 124 rotates in two bearings 125 and 126 rigid with the two-part housing 119*a*–119*b*. The bearing 126 serves as a base-plate for a casing 127 containing torsion bars 128 which are assembled in pairs concentrically with the shaft 124, are symmetrically distributed thereabout and have cut into their lower ends spur teeth 129 meshing with a spur gear 130 which is rigid with the shaft 124 and hence with the bevel pinion 123. The torsion bar ends remote from the pinion 123 have anchoring portions 131 formed thereon, which portions may be square, as shown in FIG. 3. The anchoring portions 131 of adjacent pairs of torsion bars 128 are secured in the casing 127 by screws 132 which screw into casing portions 133 that are separated by slots 134 from the casing portions 135 through which said screws extend freely. This prevents play or peening at the anchoring points. The casing 127 additionally contains a double-acting hydraulic damper 136, the vanes 137 of which are rigid with the shaft 124 and its enclosure 138 with the casing 127.

This particular arrangement of the parts 116*a*, 116*b*, whereby the latter penetrate into the housing 119*a*, 119*b*, provides therebetween a substantial space which may be used as indicated hereinbelow.

FIG. 18*a* shows how the bearing 125 is secured to the housing 119*a*, 119*b* through the medium of a part 139. FIG. 18*b* shows the external ribbing of the housing 119*a*, 119*b*.

The integrated suspension system as hereinbefore described is shown in FIG. 20 as being mounted in a motor vehicle chassis comprising a front steerable wheel 140 which can be swivelled about a king-pin (masked by the tyre) by means of a link 141 and a steering bell-crank 142. This wheel is supported by an arm 143. The two central wheels 144*a* and 144*b* are rigidly connected to tubular shafts 111*a*, 111*b* through arms 145*a* and 145*b* which are in turn pivotable through a limited angle about two vertical pins 146*a*, 146*b* when in their mean position, and this pivotal motion is controlled by mechanisms 147*a* and 147*b* and serves to improve roadholding when negotiating bends. Obviously, however, this arrangement is given by way of a specific example of application only. The two tubular shafts 111*a* and 111*b* are supported in two bearers 112*a* and 112*b* rigid with the chassis 113. Said tubular shafts are connected to the suspension system, which is shown here in its actual position on the chassis and in partial section to disclose the circular sector element 116*a*, the toothed sector 122*a* and the bevel pinion 123.

Through said tubular shafts 111*a*, 111*b* extend two drive shafts 115*a*, 115*b* connected to a differential 148 which is in turn connected to the engine 149 through a propeller shaft 150 and which is accommodated in the free space provided in the housing 119*a*, 119*b*, as indicated precedingly (see FIG. 17).

FIG. 21 is a side elevation view in partial section of the chassis and the suspension system as a whole. Clearly visible thereon is the external ribbing of the two-part housing 119*a* 119*b* and also the casing 127 containing the elastic members and a damped oleo-pneumatic elastic device 51 of the type described with reference to FIG. 1 and associated to rotation in unison of the wheel-bearing arms 145*a*, 145*b*. The piston control link associated to the device 151 is pivotally connected to a point 152 of the two-part housing 119*a*, 119*b*. The cylinder 151 is rigidly united with the chassis through the medium of a bridge-piece 153 carried on the chassis cross-member 154, as is clearly shown in FIG. 22.

The system hereinbefore described operates in the following manner:

(a) Rotation in unison: when the wheel-bearing arms 145*a* and 145*b* move symmetrically in the same direction, the forces applied by the ground to the wheels are transmitted, through said arms, the tubular shafts 111*a* and 111*b*, and the circular sector-shaped parts 116*a*, 116*b*, to the toothed sectors 122*a*, 122*b*, which mesh in opposition with the bevel pinion 123. The latter therefore remains stationary and transmits the force applied to it, through its shaft 124, to the two-part housing 119*a*, 119*b* which is thus caused to swivel alone about the tubular shafts under the control of the oleo-pneumatic device 151.

(b) Differential motion: when the wheel-bearing arms 145*a*, 145*b* move in opposite directions by the same amplitude (roll motion), the two sectors 122*a*, 122*b* rotate in opposite directions and in turn rotate the bevel pinion 123 which controls asymmetrical movement of the wheels through the torsion bars 128 and their damping device 138. The housing 119*a*, 119*b* remains stationary in this case.

In the arrangement shown in FIGS. 23 and 24, each torsion bar 128 mounted in an auxiliary casing 154 closed by an anchoring plate 155 has formed on one of its ends the gear teeth 129 which mesh with the pinion 130 rigid with the shaft 124 of bevel pinion 123 and, on its other end, the square section 131 clamped in the plate 155 which is rigid with a toothed sector 156 meshing with a worm gear 157 which rotates in a bearing 158 rigid with the casing 127 and in a further bearing 159 fitted thereinto. The worm gear has its shaft 160 coupled to a hydraulic or electric motor whereby to control sideways tilt of the vehicle.

In the arrangement illustrated in FIGS. 23 and 24, the sideways tilt control is obtained by a motor driving the shaft 160. The toothed sector 156 is rotated by the worm gear 157 and turns the anchor plate 155, thereby causing rotation of the torsion bars about the shaft 124, and rotation of the bevel pinion 123.

In the alternative constructional form based on FIGS. 23 and 24 and shown in FIGS. 25 and 26, the torsion bars 128 remain identical but the anchor plate 155*b* in which the square ends 131 of the bars are clamped carries a lug 161 to which is pivotally connected, through a pin 162, a link 163 the other end of which is pivotally connected at 163*a* to a sliding tube 164 bearing thereon a piston 165 which is slidable in a cylinder 166 which has a flange 167 for securing it to the casing 127*b* and two end closures 168 and 168*a* fitted with fluid-tight seals.

In this specific arrangement, an intake of oil under pressure on one side of the cylinder 166 with a correlative oil discharge from the other side will cause the piston 165 rigid with tube 164 to move the link 163, thereby turning the anchor plate 155*b* and rotating the torsion bars about the shaft 124, as well as the bevel pinion 123.

In the further alternative embodiment shown in FIGS. 27 and 28, the elastic members and their damper are constituted by a double-acting oleo-pneumatic device and dual opposed elastic media. An eye-ended lever 169 rigid with the shaft 124*c* of bevel pinion 123 is pivotally connected to a link 170 the other end of which is pivotally connected to a sliding tube 171 bearing thereon a piston 172 which is slidable in a cylinder 173. Said cylinder has its two end closures 174 and 175 rigidly interconnected by tie-rods 176 and is fixedly secured to the base-plate 126*c* at 177 and 177*a*. The two end closures have screwed thereon the two suspension spheres 178 and 179 and bear fluid-tight bearings 180 and 181 through which the tube 171 slides.

In this instance, rotation of bevel pinion 123 in response to differential movement of the wheel-bearing arms produces rotation of the level 169 which, through the link 170 and the sliding tube 171, displaces the piston 172 in the cylinder 173. Oil is dispatched into one of the spheres 178 or 179 depending on the direction of the movement thereby compressing the volume of gas contained in that sphere.

In order to control the sideways tilt of the vehicle, oil is led to one side of the piston 172, the excess oil being recovered from the other side. The piston is then displaced and rotates the lever 169, which in turn rotates the bevel pinion 123.

While there has been shown and described the presently preferred embodiments of the suspension system of this invention, it will be well understood by those skilled in the art that various changes and modifications may be made in these embodiments. It is, therefore, to be understood that the description hereinbefore set forth is not to be considered a limitation, but that changes may be made within the scope of the invention as set forth in the appended claims.

What I claim is:

1. An integrated suspension system for a vehicle with two pairs of wheels mounted on a chassis comprising for each pair of wheels, two aligned rotatable main shafts having axes substantially parallel with the chassis plane and rigidly connected to the respective wheel hubs by means of wheel-bearing members, a differential reversal device carried by a support pivotally connected to the chassis for movement about an axis aligned with that of said main shafts, said device having a plurality of members mechanically connected to the ends of said main shafts and being so devised that in the absence of any movement of said support relative to the chassis concerted motion of said main shafts in opposite directions is possible by the rotation relative to said support of at least one movable component inserted between said differential reversal device members and two damped sets of elastic devices of which the first controls angular movement of said movable component relative to said support and the second, which bears a control link, controls angular movement of said support relative to the chassis about its pivotal connection thereto, whereby the first set of elastic devices determines flexibility of said main shafts for differential motion thereof and the second set of elastic devices flexibility for motion in unison thereof in the same direction.

2. A suspension system according to claim 1, wherein the support pivotally connected to the chassis is shaped as a housing, said rotatable main shafts being hollow.

3. A suspension system according to claim 1, wherein the wheels mechanically connected to said main shafts form a pair of wheels the axes of which lie in a vertical plane transverse to the chassis.

4. A suspension system according to claim 1, wherein the wheels mechanically connected to said main shafts form a pair of wheels both located on one side of the vehicle.

5. A suspension system according to claim 1, wherein said wheel-bearing members connecting the wheels to said main shafts comprise arms transverse to the chassis.

6. A suspension system according to claim 1, wherein said wheel-bearing members connecting the wheels to said main shafts comprise arms longitudinal in relation to the chassis.

7. A suspension system according to claim 1, wherein said differential reversal device members consist of two toothed circular sectors centred upon the axis of said main shafts and respectively supported by the latter, and said movable component consists of a rotatable gear wheel meshing with said toothed sectors and rotatably mounted on said movable support about an axis parallel with that of said main shafts.

8. A suspension system as claimed in claim 7, wherein said rotatable gear wheel has two sets of teeth meshing respectively with said toothed sectors.

9. A suspension system as claimed in claim 7, wherein said differential reversal device is contained in said support which is shaped as a housing rotatable about an axis in line with that of said main shafts and rigid with a torsion bar coaxial to said axes, said second damped set of elastic devices consisting of a double-acting damper which elastically connects said housing to the chassis whereby to determine the flexibility of said main shafts for differential rotation thereof, the flexibility of said shafts for rotation in unison thereof in the same direction being determined by said first damped set of elastic devices which consists of a single-acting damper inserted between said rotatable gear wheel and said housing.

10. A suspension system as claimed in claim 9, wherein the torsion bars respectively associated to the two pairs of wheels of the vehicle are mechanically connected to a double-acting actuator which is in turn mechanically connected to the vehicle chassis, whereby acting as a sideways tilt servo-control device.

11. A suspension system according to claim 1, wherein said movable component consists of a member supporting reciprocal cams and rotatable about an axis parallel with that of said main shafts and mechanically connected to said support and said differential reversal device members consist of cam followers which bear against said cams and are supported by levers rigidly connected respectively to the facing ends of said main shafts, said cams being supported by a member rotatable about an axis parallel with that of said main shafts and connected to said support.

12. A suspension system according to claim 11, wherein said reciprocal cams are disposed adjacent the same transverse plane.

13. A suspension system according to claim 11, for a pair of wheels the axes of which are aligned transversely of the chassis, wherein an auxiliary intermediately-fulcrumed cam is rigidly connected to said reciprocal cams, said auxiliary cam being drivingly engaged by the cam follower of an auxiliary intermediately-fulcrumed lever rigidly connected to the control link of said second set of elastic devices determining the flexibility of said mian shafts for motion in unison thereof in the same direction.

14. A suspension system according to claim 11, wherein said differential reversal device is so devised that in the course of a differential motion of the pair of wheels, the wheel-bearing members traverse equal and opposite angles.

15. A suspension system according to claim 11, wherein said differential reversal device is so devised that the wheel-bearing member moving away from the ground traverses an angle smaller than that traversed by the wheel-bearing member moving toward the ground when said device is inclined.

16. A suspension system according to claim 11, wherein an auxiliary end-fulcrumed cam operates during rotations of the differential reversal device support whereby to vary the lever arm with which is actuated said second set of elastic devices which determines flexibility of said main shafts for motion in unison thereof in the same direction, and thereby modify the degree of flexibility with increasing deflection of the wheels.

17. A suspension system according to claim 16, wherein said auxiliary end-fulcrumed cam is rotatable about a shaft rigidly connected to the chassis and parallel with said main shafts, said cam being rigid with the control link of said second set of elastic devices determining flexibility of said main shafts for motion in unison thereof in the same direction, which set is an oleo-pneumatic actuator, and said cam having a countering thrust exerted against it by a cam follower the supporting lever of which is pivotally connected to the movable support of said differential reversal device.

18. A suspension system according to claim 16, wherein said intermediately-fulcrumed lever carries two distinct cam followers with parallel axes, of which one rides over said auxiliary intermediately fulcrumed cam rigid with the reciprocal cams and the other rides over said auxiliary end-fulcrumed cam pivotally connected to the chassis about a separate shaft parallel with the axis of said main shafts and drivingly coacts with said second set of control link of the elastic devices determining flexibility of said main shafts for motion in unison thereof in the same direction.

19. A suspension system according to claim 11, wherein said first set of elastic devices defining flexibility of said main shafts for differential motion thereof in roll is an oleo-pneumatic type of unit providing symmetrically opposed actions and comprising a cavity bounded by a cylinder and divided into two inversely deformable compartments of constant total volume by a piston mechanically connected to said movable component by a piston rod and a control link, said two compartments being respectively connected through damping means to elastic media operating in mutual opposition.

20. A suspension system according to claim 19, wherein the piston rod movable within the cylinder bounding said cavity extends through the two end faces thereof and through fluid-tight glands, and wherein, in order to reduce the lateral reactions due to its variable obliquity, the control link of said piston is provided with adequate lateral clearance within said piston rod by hollowing out the latter accordingly.

21. A suspension system according to claim 19 comprising means for transferring liquid from one of the inversely deformable compartments to the other, whereby providing control of the equilibrium point in differential wheel movement as well as sideways tilting of the vehicle both in longitudinal equilibrium and lateral inclination by a servo motor or wheel deflection corrector.

22. A suspension system according to claim 21, wherein said inversely deformable compartments, assigned in identical fashion for an identical type of differential rotation of the wheel-bearing members, are directly interconnected and fed by the same circuit for correcting the attitude of the vehicle or for servo controlling its sideways tilt in a turn, toward the inside thereof.

23. A suspension system according to claim 11, wherein said second set of elastic devices determining flexibility of said main shafts for motion thereof in unison in the same direction is a single-acting oleo-pneumatic type device comprising a cavity which contains a piston mechanically connected to said movable support and elastically connected to an elastic medium through suitable damping means.

24. A suspension system according to claim 23, wherein said oleo-pneumatic device contains an energizing liquid and said elastic medium is enclosed in a chamber wherein it is separated by a deformable diaphragm from the energizing liquid of said oleo-pneumatic devices.

25. A suspension system according to claim 1, wherein said movable support and main shafts, together with said differential reversal device, are so devised as to permit accommodating mechanical coupling means to internal shafts mechanically connected to the wheels.

26. A suspension system according to claim 25, wherein said rotatable main shafts are tubular shafts which have extending transversely therethrough the mechanical internal coupling shafts to the wheels and which have one of their extremities respectively connected to the wheel-bearing members of the pair of wheels and the other facing extremities supporting levers which form said differential reversal device members and which leave a substantial space therebetween for accommodating mechanical coupling components such as for transmitting a driving or restraining torque to the internal shafts, said levers having their free ends penetrating into the suspension system movable support rotatable about the axis common to said tubular shafts and driving in known manner the movable component of said differential reversal device which is carried by said movable support and which is rotatable about an axis perpendicular to the axis common to said tubular shafts.

27. A suspension system according to claim 26, wherein said levers are circular sector-shaped parts bearing thereon two toothed sectors meshing with a bevel pinion which forms the movable component of said differential reversal device.

28. A suspension system according to claim 27, wherein said first set of damped elastic devices controlling the rotation of said bevel pinion is a set of torsion bars disposed in parallelism with the pinion shaft and symmetrically distributed thereabout, one of the ends of each torsion bar meshing with spur teeth coaxially and rigidly connected with said bevel pinion by a common shaft, and the other ends being fixedly secured to a casing which encloses the suspension members, is rigidly secured to said movable support and supports a double-acting hydraulic damping device rigid with the shaft common to the bevel pinion and said spur teeth.

29. A suspension system according to claim 28, wherein said first damped set of elastic devices determining flexibility in differential motion is a double-acting oleo-pneumatic device with dual opposed elestic media, the rod of which is connected through a lever to the bevel pinion shaft and which is fixedly directed to said movable support.

30. A suspension system according to claim 27, wherein the second set of elastic devices determining flexibility of the tubular shafts for motion thereof in unison in the same direction is a single-acting oleo-pneumatic device mechanically connected between the chassis and said movable support of the suspension system.

31. A suspension system according to claim 29, characterized in that it comprises control means of sideways tilt of the vehicle and that torsion bars are anchored on a plate.

32. A suspenison system according to claim 31, wherein said control means of the sideways tilt of the vehicle comprise a motor driving, through a worm and gear wheel, said plate of the torsion bars which is fixed with the later within an auxiliary casing and with which said toothed sector is rigid.

33. A suspension system according to claim 31, wherein the control means of sideways tilt of the vehicle is a double-acting hydraulic actuator the rod of which drivingly cooperates directly with said torsion bar anchoring plate mounted with said bars in an auxiliary casing.

34. A suspension system according to claim 31, comprising means for transferring liquid between the inversely deformable compartments of said double-acting oleo-pneumatic device whereby effecting control of sideways vehicle tilt.

35. A suspension system according to claim 7, wherein said toothed sectors are disposed adjacent the same transverse plane.

References Cited by the Examiner

UNITED STATES PATENTS

| | | | |
|---|---|---|---|
| 2,787,474 | 4/1957 | Brueder | 280—112 |
| 3,156,481 | 11/1964 | Dangauthier | 280—6 |

BENJAMIN HERSH, *Primary Examiner.*

M. S. SALES, *Assistant Examiner.*